(12) United States Patent
Saxegaard et al.

(10) Patent No.: US 10,763,062 B2
(45) Date of Patent: Sep. 1, 2020

(54) SWITCHING DEVICE WITH DUAL CONDUCTIVE HOUSING

(71) Applicant: ABB Schweiz AG, Baden (CH)

(72) Inventors: Magne Saxegaard, Porsgrunn (NO); Richard Lauritzen, Skien (NO); Ståle Talmo, Skien (NO); Stanley Lohne, Porsgrunn (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/304,583

(22) PCT Filed: Jun. 2, 2017

(86) PCT No.: PCT/EP2017/063411
§ 371 (c)(1),
(2) Date: Nov. 26, 2018

(87) PCT Pub. No.: WO2017/207742
PCT Pub. Date: Dec. 7, 2017

(65) Prior Publication Data
US 2019/0304719 A1 Oct. 3, 2019

(30) Foreign Application Priority Data
Jun. 3, 2016 (EP) .................................... 16172811

(51) Int. Cl.
*H02B 13/035* (2006.01)
*H01H 33/12* (2006.01)
(Continued)

(52) U.S. Cl.
CPC ............ *H01H 33/64* (2013.01); *H01H 33/53* (2013.01); *H02B 13/035* (2013.01);
(Continued)

(58) Field of Classification Search
CPC ........ H01H 33/53; H01H 33/64; H01H 33/06; H01H 33/56; H01H 2033/426; H02B 13/035; H02B 13/045; H02B 13/075
(Continued)

(56) References Cited

U.S. PATENT DOCUMENTS 3,549,842 A * 12/1970 Fischer ................ H01H 33/882
218/60
3,814,883 A * 6/1974 Milianowicz .......... H01H 33/82
218/85
(Continued)

FOREIGN PATENT DOCUMENTS

| CN | 1926734 A | 3/2007 |
|---|---|---|
| CN | 102714402 A | 10/2012 |

(Continued)

OTHER PUBLICATIONS

Translation of JP2007300716 (Original document published Nov. 15, 2007) (Year: 2007).*
(Continued)

*Primary Examiner* — Edwin A. Leon
*Assistant Examiner* — William A Bolton
(74) *Attorney, Agent, or Firm* — Whitmyer IP Group LLC

(57) ABSTRACT

A switching device for an encapsulated electric power distribution switchgear and an electric power distribution switchgear with at least one such switching device are disclosed. The switching device has a first electrically conducting housing which encloses an actuator mechanism for a first contact assembly and a second electrically conducting housing which encloses a second contact assembly. The first electrically conducting housing is arranged at a distance from the second electrically conducting housing. The switching device further has a third housing which is electrically insulating and arranged between the first electrically
(Continued)

conducting housing and the second electrically conducting housing. The switching device is a puffer type switch.

17 Claims, 3 Drawing Sheets

(51) Int. Cl.
*H01H 33/22* (2006.01)
*H01H 33/53* (2006.01)
*H01H 33/56* (2006.01)
*H01H 33/64* (2006.01)

(52) U.S. Cl.
CPC ........... *H01H 33/125* (2013.01); *H01H 33/22* (2013.01); *H01H 2033/566* (2013.01); *H01H 2223/008* (2013.01)

(58) Field of Classification Search
USPC ......... 218/11–14, 16, 57, 59, 67–69, 79–80; 200/48 R
See application file for complete search history.

(56) References Cited

U.S. PATENT DOCUMENTS

| | | | | |
|---|---|---|---|---|
| 4,107,498 | A | * | 8/1978 | Golota ............... H01H 3/40 218/80 |
| 5,483,031 | A | | 1/1996 | Matsuda |
| 5,543,597 | A | * | 8/1996 | Watanabe ........... H01H 31/003 218/57 |
| 6,946,613 | B2 | * | 9/2005 | Otsuka ............... H01H 31/003 218/7 |
| 7,767,917 | B2 | | 8/2010 | Granhaug et al. |
| 8,232,496 | B2 | | 7/2012 | Granhaug et al. |
| 9,147,540 | B2 | * | 9/2015 | Lee ................... H01H 31/003 |
| 2007/0119818 | A1 | * | 5/2007 | Meinherz ........... H01H 31/003 218/13 |
| 2014/0233159 | A1 | * | 8/2014 | Kieffel ............... H01H 33/22 361/600 |
| 2016/0086744 | A1 | * | 3/2016 | Tasaka ............... H01H 33/002 200/293 |

FOREIGN PATENT DOCUMENTS

| | | |
|---|---|---|
| CN | 103946944 A | 7/2014 |
| CN | 102187537 A | 9/2014 |
| CN | 104956457 A | 9/2015 |
| DE | 102005009207 A1 | 8/2006 |
| EP | 1146522 A1 | 10/2001 |
| JP | 2000067716 A | 3/2000 |
| JP | 2003169411 A | 6/2003 |
| JP | 2007300716 A | 11/2007 |
| WO | 2005074074 A2 | 8/2005 |
| WO | 2013041695 A1 | 3/2013 |
| WO | 2013102284 A1 | 7/2013 |
| WO | 2014154292 A1 | 10/2014 |

OTHER PUBLICATIONS

European Search Report Application No. 16172811.8 Completed: Nov. 15, 2016; dated Nov. 24, 2016 8 Pages.
International Preliminary Report on Patentability Application No. PCT/EP2017/063411 Completed: Sep. 14, 2018 9 Pages.
International Search Report & Written Opinion of the International Searching Authority Application No. PCT/EP2017/063411 Completed: Aug. 28, 2017; dated Sep. 11, 2017 14 Pages.
Written Opinion of the International Preliminary Examining Authority Application No. PCT/EP2017/063411 dated May 14, 2018 8 Pages.
European Office Action Application No. 16 172 811 Completed: Sep. 25, 2018 7 Pages.
Chinese Office Action and Translation Application No. 2017800335929 Completed: Jun. 3, 2019, 7 Pages.
Chinese Search Report and Translation Application No. 2017800335929 Completed: May 23, 2019 5 Pages.
India Office Action with Translation Application No. 201847041923 Completed: Feb. 29, 2020 7 Pages.
Chinese Office Action and Translation Application No. 2017800335929 Completed: Jan. 22, 2020 12 Pages.

* cited by examiner

SWITCHING DEVICE WITH DUAL CONDUCTIVE HOUSING

TECHNICAL FIELD

The present invention generally pertains to a switching device for an encapsulated electric power distribution switchgear, and to an electric power distribution switchgear comprising such a switching device.

BACKGROUND

Switchgears are used in electric power systems with the purpose to control, protect and isolate electric equipment. In distribution nets, switchgears are located both on the high voltage side and the low voltage side of power transformers.

Switchgears used today for medium voltages are usually gas insulated switchgears, where the insulating gas is sulfur hexafluoride ($SF_6$). The use of $SF_6$ allows for a compact design of the switchgear since $SF_6$ has excellent arc extinguishing, electrical insulating as well as thermal dissipating properties.

Despite the many advantages of $SF_6$, alternatives thereto have recently been introduced due to the high global warming potential (GWP) of $SF_6$.

WO2014154292 A1 discloses a $SF_6$ free switch assembly and switchgear where a vacuum breaker is mounted to a single electrically conductive housing.

U.S. Pat. No. 8,232,496 B2 and U.S. Pat. No. 7,767,917 B2 disclose puffer type load break switches. In the disconnected position, separate field controllers electrically screen moving and stationary contact sets. These switches have thermoplastic enclosures for the actuator mechanisms and are primarily intended for use with $SF_6$ as dielectric insulating medium.

SUMMARY

One object of the invention is to provide an improved switching device for an encapsulated electric power distribution switchgear. The switching device is to be designed such that the electric insulating and arc quenching medium of the switchgear is subjected to the least possible electrical stress. At the same time it is essential that the switching device and also the switchgear remain compact and reliable. Further objects include the switching device and the switchgear being relatively simple to assemble and, at some point, disassemble for reuse or recycling.

These objects are achieved by the device of the appended claims.

According to a first aspect of the invention, there is provided a switching device for an encapsulated electric power distribution switchgear, which switching device comprises
- a first electrically conducting housing which encloses an actuator mechanism for a first contact assembly, and
- a second electrically conducting housing which encloses a second contact assembly,
- said first electrically conducting housing being arranged at a distance d from said second electrically conducting housing.

By arranging the contact assemblies, or at least an actuator mechanism of one of said assemblies, in separate electrically conducting housings, the dielectric withstand capability of the switching device is improved. Both the phase-to-phase and the phase-to-ground electrical insulation levels are increased. Thereby, the dielectric requirements on the medium surrounding the switching device are reduced. It has been shown that in this way the commonly used electric insulating and arc quenching medium $SF_6$ can be exchanged for a medium of a lower global warming potential.

In a closed state of the switching device, the first contact assembly is in electrical connection with the second contact assembly. In an open state of the switching device, the first contact assembly is not in electrical connection with the second contact assembly. The actuator mechanism is arranged to move the first contact assembly between the open state and the closed state.

The second electrically conducting housing is preferably cup-shaped with a rounded outer surface. In this way, the second electrically conducting housing may form an effective electric field controller for the second contact assembly. Thereby, the dielectric withstand capability of the switching device is improved further. It is also beneficial if the second electrically conducting housing is furnished with a smooth outer surface.

Preferably, the second contact assembly is arranged inside the second electrically conducting housing. This would mean that no portion of the second contact assembly protrudes outside the contour of the second electrically conducting housing.

By the use of a comparatively large second electrically conducting housing the second electrically conducting housing may form an even more effective electric field controller. Preferably, the second electrically conducting housing has a minimum outer dimension which is at least 2 times greater than the maximum outer diameter of the second contact assembly. In most designs, the outer dimension of the second electrically conducting housing shall not be greater than 4 times the maximum outer diameter of the second contact assembly Preferably, the stationary contact assembly is arranged in thermally conducting connection with the second electrically conducting housing, such that the electrically conducting second housing may function as a heat exchanger for the stationary contact assembly. The stationary contact assembly may be mechanically fixed directly to the second electrically conducting housing. A comparatively large second electrically conducting housing, as defined above, may make the second electrically conducting housing an even more effective heat exchanger.

The second electrically conducting housing may be mechanically fixed to a busbar of the encapsulated electric power distribution switchgear in which the switching device is arranged. The second electrically conducting housing may be mechanically fixed directly to the busbar. The second electrically conducting housing may comprise a mechanical attachment interface for attachment to the busbar. Alternatively, the second electrically conducting housing may be welded or soldered to the busbar.

Preferably, the first electrically conducting housing encloses the first contact assembly when the switching device is in an open state. This would mean that, in the open state, no portion of the first contact assembly protrudes outside the contour of the first electrically conducting housing.

The first electrically conducting housing may enclose at least one component of an earthing switch. Said component can be a moving earthing contact. More precisely, the earthing switch component can be an earthing knife.

The switching device comprises a third housing which is electrically insulating and arranged between the first electrically conducting housing and the second electrically conducting housing. The third housing can be a housing in which the first contact assembly operates. The first contact assembly can be the movable contact of a puffer type switch. In such a case, the movable contact could move linearly inside the third housing between the closed and the open state.

The switching device can be adapted for operating in the voltage range of 1-52 kV AC. The voltage range of 1-52 kV AC can be referred to as medium voltage (MV), see standard EC 62271-103. However, all voltages above 1 kV can be referred to as high voltage (HV).

The switching device mentioned above is a puffer type switch. The advantage of using a puffer type switch is that relatively high electric power can be managed at a relatively low cost while the dielectric requirements on the medium surrounding the switching device are reduced. Preferably, the switching device is a puffer type load break switch.

According to a second aspect of the invention, there is provided an electric power distribution switchgear comprising a sealed gas tight enclosure inside which is located at least one switching device as defined above. Such a switchgear can be referred to as a gas insulated switchgear (GIS).

The electric power distribution switchgear may comprise a busbar. The above mentioned second electrically conducting housing may be mechanically fixed to said busbar. The busbar may comprise a mechanical attachment interface adapted to cooperate with the mechanical attachment interface of the second electrically conducting housing. For example, the second electrically conducting housing and the busbar may both be furnished with corresponding bores for screws or bolts.

The enclosure of the electric power distribution switchgear may comprise a through-hole into which a switching device operating shaft of electrically insulating material may be inserted. Said switching device operating shaft may be adapted to operate the actuator mechanism for the first contact assembly. The switching device operating shaft may be configured to rotate about its longitudinal axis for operating said actuator mechanism. In a similar manner, there may be arranged an earthing switch operating shaft if the first electrically conducting housing encloses at least one component of an earthing switch.

The electric power distribution switchgear may be filled with a dielectric insulating medium having a global warming potential lower than that of $SF_6$. For example, the dielectric insulating medium may be dry air or technical air. The dielectric insulating medium may also comprise an organofluorine compound selected from the group consisting of: a fluorether, an oxirane, a fluoramine, a fluoroketone, a fluoroolefin, a fluoronitrile, and mixtures and/or decomposition products thereof.

BRIEF DESCRIPTION OF THE DRAWINGS

The invention will be explained in greater detail with reference to the accompanying drawings, wherein.

DETAILED DESCRIPTION

Figure 1:
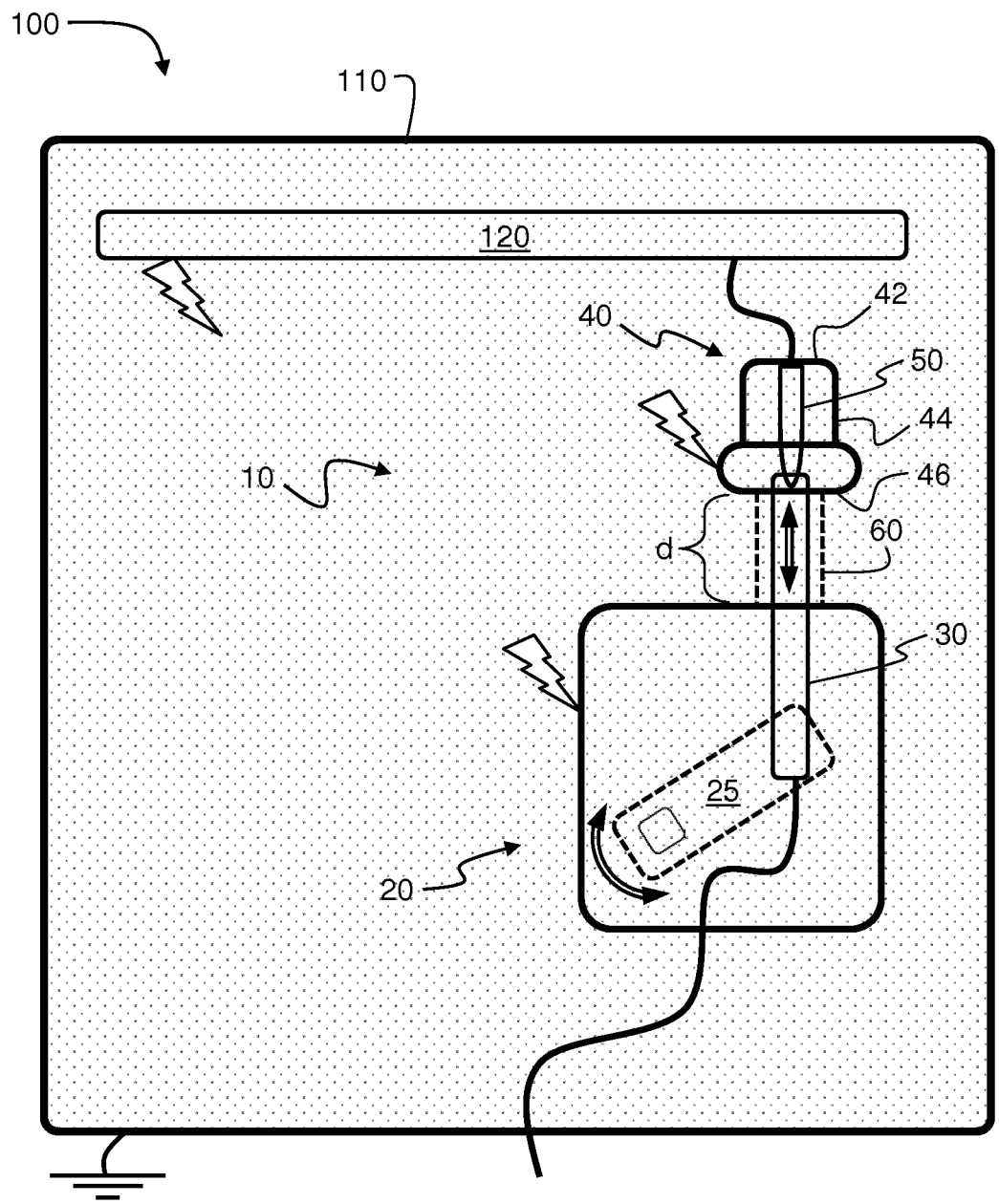
FIG. 1 shows an embodiment of the invention with the switching device in a closed state.
Figure 2:
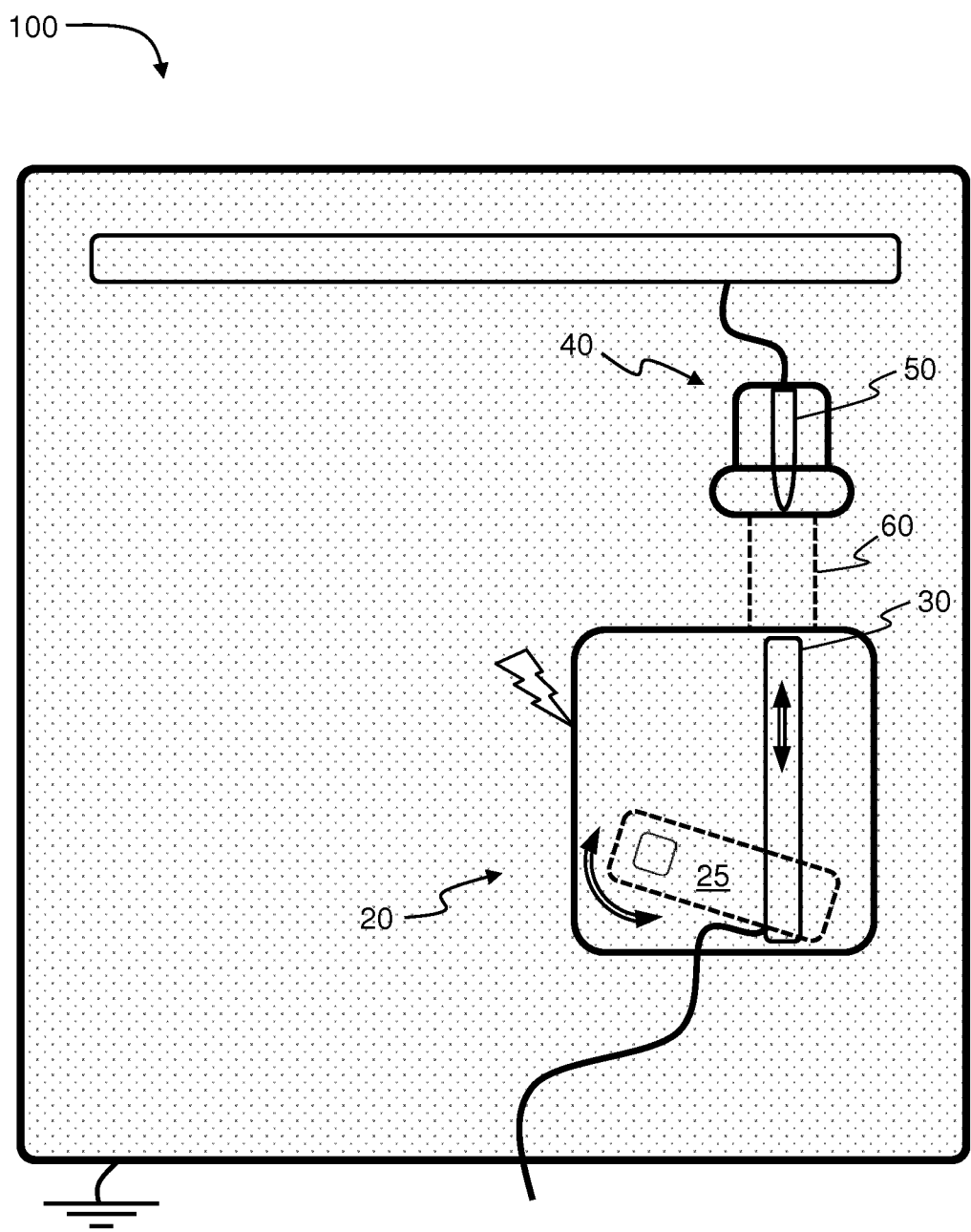
FIG. 2 shows the switching device in an open state.
Figure 3:
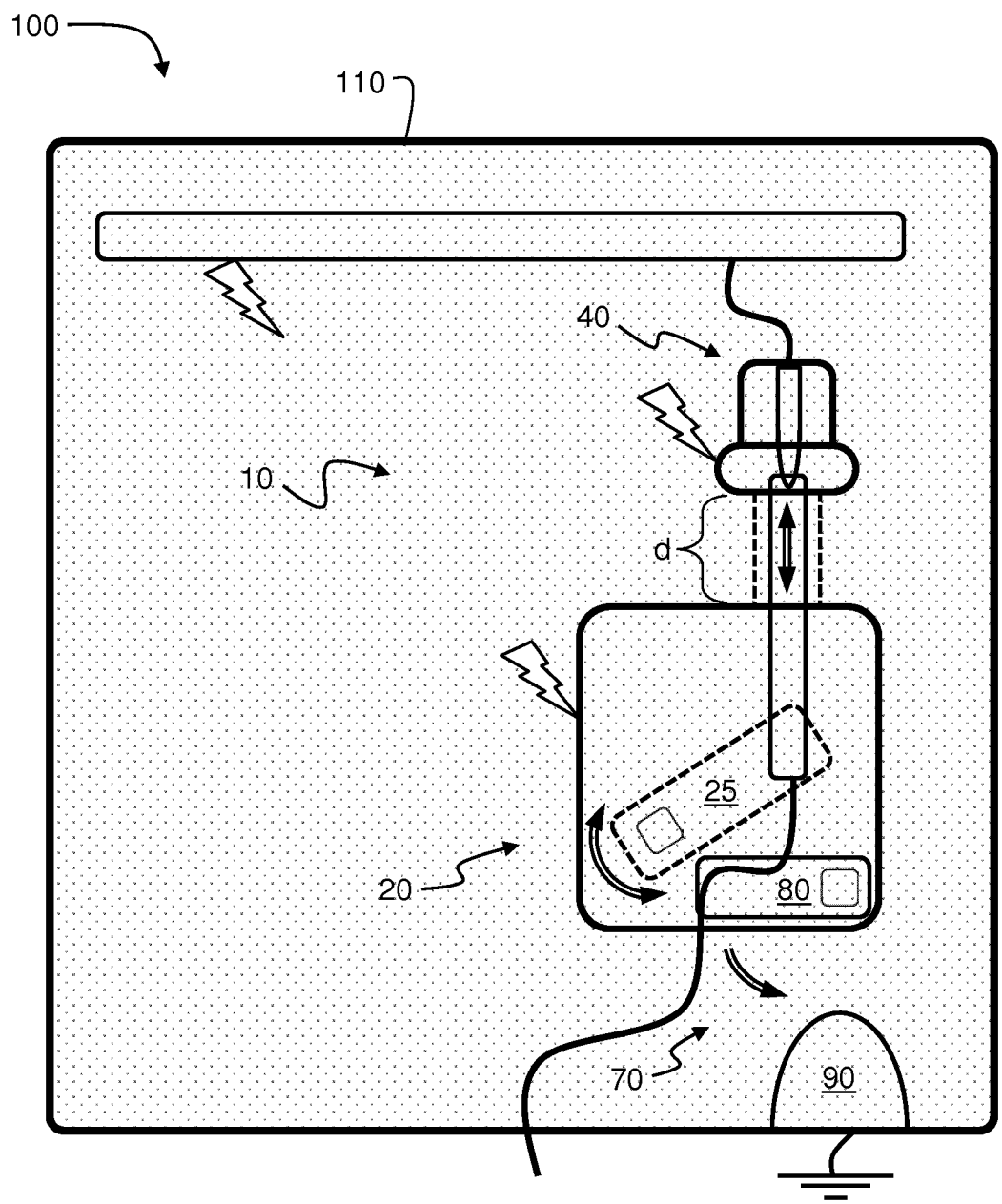
FIG. 3 shows an embodiment with a component of an earthing switch integrated in one housing of the switching device.

Referring to FIGS. 1 to 3, a switchgear 100 which comprises a metal enclosure 110 containing a switching device 10 is shown. As is illustrated by the dotted shading within the enclosure 110, the switchgear 100 is filled with an electrically insulating gas.

The switchgear 100 further comprises a busbar 120 and may also comprise a safety switch in the form of a selector switch (see WO2014154292 A1) or similar, which is however not shown here. The switchgear 100 may hold a plurality of busbars 120 and a plurality of switching devices 10 as is disclosed in WO2014154292 A1, but for brevity only one busbar 120 and one switching device 10 are illustrated herein.

As is schematically illustrated by the lower wavy line leading into the enclosure 110, the switching device 10 is connected to electrical power, typically 1-52 KV AC. The power is led through the switching device 10 to the busbar 120. Although not shown, power lines leading into and out of the enclosure 110 are surrounded by electrically insulating bushings. The enclosure 110 is made of an electrically conducting material and is at ground potential. In the lower left corner is illustrated that the switchgear enclosure 110 is grounded.

In the present embodiment, the switching device 10 is a puffer type load break switch 10. The load break switch comprises a moving (or "movable") contact assembly 30 and a stationary contact assembly 50. FIGS. 1 and 3 show the contact assemblies 30, 50 brought together in the closed state of the load break switch 10 whereas FIG. 2 shows the contact assemblies 30, 50 when separated, i.e. in the open state of the load break switch 10.

The moving contact assembly 30 is operated by an actuator mechanism 25 which in turn is operated by an operating shaft (not shown) of electrically insulating material running through the switchgear 100. The actuator mechanism comprises a lever 25 which transforms a rotational movement (illustrated by a curved double arrow) of the operating shaft into a linear movement (illustrated by a straight double arrow) of the moving contact assembly 30. As can be seen, at one end the lever 25 comprises a non-circular through-hole, adapted to the cross-sectional shape of the operating shaft, through which the operating shaft is led. The other end of the lever 25 is mechanically connected to the moving contact assembly, preferably via a connecting lever (not shown). For details on how the operating shaft and the actuator mechanism 25 may be designed and operate, reference is made to U.S. Pat. No. 7,767,917 B2.

The actuator mechanism 25 for the moving contact assembly 30 is arranged inside a first electrically conducting housing 20 (hereinafter referred to as "first housing 20"). As can be seen in FIG. 2, not only the actuator mechanism 25 but also the entire moving contact assembly 30 are housed within said first housing 20 in the open state of the load break switch 10. Similarly, the stationary contact assembly 50 is arranged inside a second electrically conducting housing 40 (hereinafter referred to as "second housing 40").

The first housing 20 is at the same potential as the moving contact assembly 30. The second housing 40 is at the same potential as the stationary contact assembly 50.

When the contact assemblies 30, 50 are in the closed state both housings 20, 40 are at live potential, which is illustrated by the flashes in FIG. 1. When the contact assemblies 30, 50 are in the open state only one housing 20, 40 is at live potential. In this example, when the contact assemblies 30, 50 are in the open state only the first housing 20 is at live potential, see FIG. 2.

Between the first and second housings 20, 40, a third housing 60 is arranged. The third housing 60 is electrically insulating, it may be made from thermoplastic material. As is illustrated in the figures, the moving contact assembly 30 moves linearly within the electrically insulating housing 60 (hereinafter referred to as "third housing 60"). More precisely, the moving contact assembly 30 is adapted to move from a closed or conducting state (FIG. 1) of the load break switch 10 in which the moving contact assembly 30 extends from the first housing 20 to the second housing 40, to an open or non-conducting state (FIG. 2) in which the moving contact assembly 30 is substantially retracted inside the first housing 20. In this example, the moving contact assembly 30 is completely retracted inside the first housing 20 in the open state. The first housing 20 comprises an opening (not shown), preferably in the form of a circular hole, for the moving contact assembly 30.

The distance d between the between the first and second housings 20, 40 is chosen such that the dielectric strength requirements of a disconnector is fulfilled. The load break switch 10 can thus function as both a load break switch and a disconnector. The distance d corresponds to the height of the third housing 60. The third housing 60 fulfils a function of a puffer type load break switch 10 which is not described in detail here, reference is made to U.S. Pat. No. 8,232,496 B2 (container 10').

Now, as can be comprehended from FIG. 2, the arrangement of the first and second contact assemblies 30, 50 in separate electrically conducting housings 20, 40, makes the load break switch 10 less susceptible to arc faults occurring between it and any adjacent load break switch as well as between the contact assemblies, the housings, or between any of these and the enclosure. In other words the dielectric withstand capability of the load break switch is increased. The first and second housings 20, 40 act as electric field controllers for the live (connected to a voltage ≥1 kV AC) components arranged within them.

Preferably, the first and second housings 20, 40 are designed with flat or rounded outer surfaces which ensure an optimal distribution of the electric field between the housings and all neighbouring conducting components of different electric potential. A rounded surface may here be defined as a surface with no radius of curvature below 5 mm. The dielectric withstand capability may be further improved by ensuring smooth outer surfaces of the first and second housings 20, 40. For this reason, the first and second housings 20, 40 may be polished or even lapped.

Turning now more in detail to the second housing 40 which forms an electric field controller for the stationary contact assembly 50, this housing 40 is cup-shaped with a closed base 42 (the upper end in the figures), a cylindrical side wall 44 and an open rim 46 (the lower end in the figures). The stationary contact assembly 50 is electrically connected to the base 42 of the second housing 40. As is illustrated in FIG. 1, in the closed state the moving contact assembly 30 passes the open rim 46 and enters inside the second housing 40 where it makes contact with the stationary contact assembly 50. In the open state, shown in FIG. 2, the cup-shaped second housing 40 functions as an electric field controller for the stationary contact assembly 50. As is illustrated, the rim 46 is rounded to ensure an optimal distribution of the electric field.

The second housing 40 is relatively large when compared to the stationary contact assembly 50, which has a beneficial effect on the distribution of the electric field around said housing 40. In the present example, the minimum outer dimension of the second housing 40 is approximately 3 times the maximum outer diameter of the stationary contact assembly 50. The minimum outer dimension of the second housing 40 can be measured in any way across and through the centre of the housing 40. The maximum outer diameter of the stationary contact assembly 50 is measured anywhere across the stationary contact assembly 50.

The stationary contact assembly 50 is mechanically fixed to the second housing 40, more precisely to the base 42 of the second housing 40. This ensures excellent heat transfer by conduction between the stationary contact assembly 50 and the second housing 40. Thereby, the second housing 40 functions as a heat exchanger for the stationary contact assembly 50. The second housing 40 may be made from the same material as the major portion of the stationary contact assembly 50, in order to promote heat dissipation. The second housing 40 may be made from good heat conducting materials such as aluminium (aluminum in US English) or copper. Aluminum being the preferred material due to the reduced cost of raw material and manufacturing.

The second housing 40 functions as both an electric field controller and a heat exchanger for the stationary contact assembly 50.

In addition, the second housing 40 may be fixedly attached to the busbar 120, which is not illustrated here. In this way, the second housing 40 may also function as current conductor. Also, by attaching the second housing 40 to the busbar 120, it may function as a holder for the second contact assembly 50. For this reason, the second housing 40 may be furnished with a mechanical attachment interface (not shown) for attaching it to the busbar 120. Such as interface may be constituted by one or several bores for screws or by one part of a snap-fit connection (the other part being formed on the busbar).

FIG. 3 shows a switchgear 100 as the one shown in FIGS. 1 and 2, but with the addition of an earthing switch 70. The earthing switch 70 comprises a moving (or "movable") earthing contact 80 and a stationary earthing contact 90. The earthing switch 70 may also comprise other components such as triggering means and drive means, for example a spring drive, which are not described herein. The moving earthing contact 80 is shown with a non-circular through-hole at the right end by means of which the moving earthing contact 80 may be operated in a manner similar to the lever 25 described above.

The earthing switch 70 is in this embodiment a knife switch with the moving earthing contact 80 in the form of an earthing knife 80 and the stationary earthing contact 90 in the form of an earthing protrusion 90 which is electrically connected to the enclosure 110. As is illustrated, the earthing protrusion 90 is attached to the enclosure 110. The stationary earthing contact 90 is at ground potential. When the earthing switch 70 is actuated (illustrated by the curved arrow below the first housing 20), the earthing knife 80 is brought from being out of contact with the earthing protrusion 90 to being in contact with earthing protrusion 90.

In the open state of the earthing switch 70, which is illustrated in FIG. 3, the earthing knife 80 is enclosed by the first housing 20. This means that the first housing 20 forms an electric field controller for the earthing knife 80. The first housing 20 comprises an opening (not shown) in the form of a slot for the earthing knife 80.

As was mentioned above, the earthing switch 70 may comprise other components which are not described herein. Such components may be at live potential and may be electrically shielded by the first housing 20, especially if such components comprise sharp edges which are known to be disadvantageous since they cause a high local electrical field stress. In one embodiment, the earthing knife 80 is allowed to protrude somewhat outside the first housing 20 in the open state of the earthing switch 70, but at least one live component of the earthing switch 70 is completely enclosed by the first housing 20.

The arrangement of at least one live component of an earthing switch enclosed in an electrically conducting housing does not prescribe a switching device with two separated electrically conducting housings as described herein. To the contrary, such an earthing switch design can also be employed in switching devices comprising only one electrically conducting housing which is arranged in an encapsulated electric power distribution switchgear.

As will be comprehended by the skilled person, the first and second housings 20, 40 are not sealed housings. There are openings in said housings 20, 40 for the moving contacts to enter and exit. Also, there may be openings to allow cooling, which principle is described in WO2014154292 A1. As has been described, the first and second housings 20, 40 are designed to ensure an optimal electric field, sharp edges should be avoided and components meant to stay at different electric potential shall be kept at a minimum distance from each other. It has been stated that the second housing 40 encloses the second contact assembly 50. The term "enclose" is to be construed as encircle or embrace, it is not meant to define that the second housing 40 forms a sealed enclosure for the second contact assembly 50. The same is valid for the first housing 20.

In the figures, dashed lines illustrate components made of electrically insulating material, such as the third housing 60 and the lever 25. Continuous lines illustrate components made of electrically conducting material, such as the enclosure 110, the busbar 120, the first and second housings 20, 40 and their contact assemblies 30, 50. The components made of electrically insulating material may be made of polymer material. The components made of electrically conducting material may be made of metal.

The contact assemblies 30, 50 and the function of the puffer type switch have not been described in detail herein. The moving contact assembly 30 may comprise an arc resistant inner nozzle and a highly conductive main contact, and the stationary contact assembly 50 may comprise arc resistant contact pin and a highly conductive multi contact. Reference is made to U.S. Pat. No. 8,232,496 B2 for a detailed description.

The invention is not limited to the embodiments shown above, but the person skilled in the art may modify them in a plurality of ways within the scope of the invention as defined by the claims. Thus, the invention is not limited to the switching device being a load break switch, it may also be, for example, a circuit breaker.

The invention claimed is:

1. An electric power distribution switchgear comprising a sealed gas tight enclosure inside which is located at least one switching device, the at least one switching device including:
a first electrically conducting housing which encloses an actuator mechanism for a first contact assembly,
a second electrically conducting housing which encloses a second contact assembly,
said first electrically conducting housing being arranged at a distance from said second electrically conducting housing,
a third housing which is electrically insulating and arranged between the first electrically conducting housing and the second electrically conducting housing, and
said at least one switching device being a puffer type switch;
wherein the enclosure is only filled with a dielectric insulating medium having a global warming potential lower than that of $SF_6$.

2. The electric power distribution switchgear of claim 1, wherein the second electrically conducting housing is at a same electric potential as the second contact assembly.

3. The electric power distribution switchgear of claim 2, wherein the second electrically conducting housing is cup-shaped and has a rounded outer surface, whereby the second electrically conducting housing is adapted to form an electric field controller for the second contact assembly.

4. The electric power distribution switchgear of claim 2, wherein the second electrically conducting housing has a minimum outer dimension which is greater than 2 times a maximum outer diameter of the second contact assembly.

5. The electric power distribution switchgear of claim 2, wherein the second electrically conducting housing includes a mechanical attachment interface for fixedly attaching the second electrically conducting housing to a busbar of the encapsulated electric power distribution switchgear.

6. The electric power distribution switchgear of claim 2, wherein the second electrically conducting housing is made of aluminium or copper.

7. The electric power distribution switchgear of claim 2, wherein the first electrically conducting housing encloses the first contact assembly when the switching device is in an open state.

8. The electric power distribution switchgear of claim 1, wherein the second electrically conducting housing has a minimum outer dimension which is greater than 2 times a maximum outer diameter of the second contact assembly.

9. The electric power distribution switchgear of claim 1, wherein the second electrically conducting housing includes a mechanical attachment interface for fixedly attaching the second electrically conducting housing to a busbar of the encapsulated electric power distribution switchgear.

10. The electric power distribution switchgear of claim 1, wherein the second electrically conducting housing is made of aluminium or copper.

11. The electric power distribution switchgear of claim 1, wherein the first electrically conducting housing encloses the first contact assembly when the switching device is in an open state.

12. The electric power distribution switchgear of claim 1, wherein the first electrically conducting housing further encloses at least one component of an earthing switch.

13. The electric power distribution switchgear of claim 12, wherein said component is a moving earthing contact.

14. The electric power distribution switchgear of claim 1, wherein said at least one switching device is configured such that the third housing is a housing in which the first contact assembly operates, said first contact assembly being a movable contact of the puffer type switch.

15. The electric power distribution switchgear of claim 1, wherein the at least one switching device is adapted for operating in a voltage range of 1-52 kV AC.

16. The electric power distribution switchgear of claim 1, wherein said at least one switching device is a puffer type load break switch.

17. The electric power distribution switchgear of claim 1, wherein the dielectric insulation medium includes an organofluorine compound selected from a group consisting of: a fluorether, an oxirane, a fluoramine, a fluoroketone, a fluoroolefin, a fluoronitrile, and mixtures and/or decomposition products thereof.

* * * * *